United States Patent
Levin et al.

(10) Patent No.: US 7,319,948 B2
(45) Date of Patent: Jan. 15, 2008

(54) BLOCKING ACCESS TO SELECTED APIS

(75) Inventors: Ariel Levin, Rosh Ha-Ayin (IL); Daniel Blaukopf, Ra'anana (IL)

(73) Assignee: Sun Microsystems, Inc., Santa Clara, CA (US)

( * ) Notice: Subject to any disclaimer, the term of this patent is extended or adjusted under 35 U.S.C. 154(b) by 735 days.

(21) Appl. No.: 10/339,305

(22) Filed: Jan. 10, 2003

(65) Prior Publication Data

US 2003/0208748 A1    Nov. 6, 2003

Related U.S. Application Data

(60) Provisional application No. 60/378,460, filed on May 6, 2002.

(51) Int. Cl.
    *G06F 9/455* (2006.01)
(52) U.S. Cl. .......................... 703/24; 703/23; 717/134
(58) Field of Classification Search .................. 703/24, 703/23; 717/134, 135, 138; 719/329
    See application file for complete search history.

(56) References Cited

U.S. PATENT DOCUMENTS 5,553,286 A * 9/1996 Lee ............................ 717/162
5,966,702 A * 10/1999 Fresko et al. ................. 707/1
6,901,583 B1 * 5/2005 Park ........................... 717/134
2003/0208748 A1 * 11/2003 Levin et al. ................. 717/134

OTHER PUBLICATIONS

Kruskal, Vincent; "Managing Multi-Version Programs with an Editor", Jan. 1984, IBM Journal of Research Development, vol. 28, No. 1.*
Richard A. Stallman, "Using and Porting GNU CC", 1998, Free Software Foundation.*
Donald E. Knuth, "The art of computer programming, vol. 1, fundamental algorithms", 1997, third edition, Addison Wesley Longman.*
Mobile Information Device Profile (JSR-37), JCP Specification, Java 2 Platform, Micro Edition, 1.0a (Sun Microsystems Inc.)., Palo Alto, California, Dec. 2000.

* cited by examiner

*Primary Examiner*—Paul Rodriguez
*Assistant Examiner*—Russ Guill
(74) *Attorney, Agent, or Firm*—Hoffman Wasson & Gitler

(57) ABSTRACT

A method for testing operation of a computer application. An emulator is provided to run on a development platform subject to limitations of multiple different target devices, the emulator including a set of emulator APIs corresponding to target Application Program Interfaces (APIs) available on the different target devices. A subset of the target APIs that are supported by one of the target devices is specified. Access by the emulator to the emulator APIs that correspond to one or more of the target APIs that are not in the specified subset is blocked. The application is run on the emulator subject to the blocked access.

36 Claims, 4 Drawing Sheets

BLOCKING ACCESS TO SELECTED APIS

CROSS-REFERENCE TO RELATED APPLICATIONS

This application claims the benefit of U.S. Provisional Patent Application Ser. No. 60/378,460, filed May 6, 2002, which is incorporated herein by reference.

COPYRIGHT NOTICE

A portion of the disclosure of this patent document contains material that is subject to copyright protection. The copyright owner has no objection to the facsimile reproduction by any of the patent disclosure, as it appears in the Patent and Trademark Office patent files or records, but otherwise reserves all copyrights whatsoever.

REFERENCE TO COMPUTER PROGRAM LISTING APPENDIX

Computer program listing appendices are submitted herewith on one compact disc and one duplicate compact disc. The total number of compact discs including duplicates is two. The files on the compact disc are ASCII text files in which the characters are displayed as their corresponding values in hexadecimal format. Their names, dates of creation, directory locations, and sizes in bytes are:
 1. Directory appndx-a containing file 46247A.HEX (Appendix A) of Nov. 12, 2002 and of length 24,367 bytes.
 2. Directory appndx-b containing file 46247B.HEX (Appendix B) of Nov. 12, 2002 and of length 12,803 bytes.
 3. Directory appndx-c containing file 46247C.HEX (Appendix C) of Nov. 12, 2002 and of length 6,195 bytes.

The files are referred to herein as Appendices A, B and C, respectively. The material on the compact discs is incorporated herein by reference.

FIELD OF THE INVENTION

The present invention relates generally to computer software development, and specifically to interfacing between a user-written application and a supplied set of application program interfaces (APIs).

BACKGROUND OF THE INVENTION

Application developers frequently develop applications using Application Programming Interfaces (APIs), which are typically supplied by vendors and other groups. In the most generic sense, APIs define a software application environment or operating system with which applications can interface. APIs include as part of their definition a set of defined interfaces for methods to which applications can issue requests.

An example of a language and development environment that delivers APIs is the Java™ language, developed by Sun Microsystems. Java delivers APIs via classes grouped in class libraries. An integral component of the Java architecture is the Java Virtual Machine (JVM), which is available on numerous computing platforms in order to provide Java with a high level of platform independence. The Java 2 Platform, Micro Edition (J2ME™), specifies a scaled-down version of the JVM, known as the K Virtual Machine (KVM), designed for mobile wireless information devices such as cellular phones and personal digital assistants (PDAs).

J2ME currently provides two configurations, Connected Limited Device Configuration (CLDC) and Connected Device Configuration (CDC). CDC was developed for more powerful devices, and therefore supports a full Java 2 Virtual Machine. CLDC is targeted at devices with limited memory and/or processing power, and does not support standard Java 2 Standard Edition (J2SE) APIs. CLDC includes a core development library and specifies the KVM. A Mobile Information Device Profile (MIDP) is layered on top of CLDC and defines a set of Java APIs that provide an application runtime environment for mobile information devices, such as mobile telephones. These APIs include the user interface, networking and messaging. MIDP is defined in *Mobile Information Device Profile* (JSR-37), JCP Specification, Java 2 Platform, Micro Edition, 1.0a (Sun Microsystems Inc., Palo Alto, Calif., December 2000), which is incorporated herein by reference. MIDP applications that use the MIDP and CLDC APIs are known as MIDlets, which are executed on the KVM.

Sun Microsystems has made available a Wireless Toolkit (WTK) for use in developing J2ME applications suitable for running on mobile devices. Source code for the WTK is available under license from Sun. WTK provides an emulation function, which enables the application developer's workstation to emulate the operation of a target mobile device so that the developer can see how the application will run in the target environment.

An emulator running on a personal computer or other workstation preferably can emulate the behavior of a variety of target devices that run J2ME virtual machines. Each target device supports a core API and a combination of optional APIs. An emulator should be configurable to provide access only to the APIs supported by the selected target device, and not to other APIs not supported by the target device. This device-specific configurability is essential for providing a reliable application development and testing environment. It may not be feasible, however, to provide an emulator for each combination of APIs supported in available devices, as the number of possible combinations is often too great. In addition, all possible combinations may not be known at the time the toolkit is supplied.

The natural solution to this problem is to configure the emulator to support the core API, and then to allow the user to select which optional APIs to use. This is the solution that is used in J2SE application development. It is not practical on an emulator for J2ME, however, because J2ME virtual machines are by their nature not extensible; they have a fixed set of APIs preinstalled in a ROM image.

Although this problem has been described herein with reference to Java and J2ME, a similar problem would occur in any development environment in which an application being developed must be denied access to APIs not supplied in the target run-time environment. Additionally, this problem may occur when an application developer uses a single development environment to develop different versions of an application for execution on different target platforms, each of which may have a different subset of an overall API set. In such a case, it is desirable to limit the API subset per implementation in an efficient manner.

The need to efficiently limit access to certain APIs may similarly arise when an application developer is developing applications for a market that will not be purchasing certain optional APIs, for example to minimize per-API software license fees.

Sun, Sun Microsystems, the Sun Logo, Java, J2ME are trademarks or registered trademarks of Sun Microsystems, Inc., in the United States and other countries.

SUMMARY OF THE INVENTION

Embodiments of the present invention provide an emulator suitable for developing applications for multiple different target devices, each of which has access to a limited set of target Application Programming Interfaces (APIs). An emulator is supplied and configured to support a complete set of the available APIs. To develop an application for a particular target device with limited API resources, the developer selects a subset from the complete set APIs that are available. The emulator blocks access to APIs not included in the subset, so that if the developer attempts to use a non-included API, an error is reported at run-time by the emulator.

Preferably, the emulator is provided with lists of classes associated with each target API. When the emulator is started, and the developer selects the subset of APIs that is to be available to the application under development, a configuration file is generated containing the API subset. Based on the list of APIs in the configuration file, the emulator generates a list of all classes to be blocked, using information from the appropriate class list files. The virtual machine running on the emulator initializes an API ROM image containing all possible target APIs, by copying the image into RAM. The names of all the classes associated with the disabled API are removed from the RAM copy of the API ROM image. Subsequently, during run-time, if code being executed by the virtual machine attempts to load a class whose name has been removed from the RAM copy of the API ROM image, the class is not found and an error is generated.

The solution provided by the present invention allows a developer to conveniently limit the development environment, by disabling the classes that will not be available on the target device. This solution requires minimal modifications to the virtual machine used in development environment, and thus preserves full compatibility with the virtual machine running on the target device, which is critical for reliable testing of applications. This is a particularly useful approach for an emulator of low-end devices, such as MIDP devices, each of which has its own limited, non-extensible set of applicable APIs. This approach can be understood as the inverse of the conventional method of starting with a core API and then adding optional APIs at run-time. Instead, emulators in accordance with the present invention start with the core API and all optional APIs, and then deny access to some or all of the optional APIs at run-time.

In some embodiments of the present invention, the techniques described herein are used for developing applications suitable for running on mobile devices, using an object-oriented, platform-independent programming language, such as Java applications for mobile devices that support J2ME and implement a KVM. To support the development of such Java applications, the emulator preferably comprises the Sun Microsystems WTK, with APIs as defined by MIDP. Alternatively, the principles of the present invention may be applied to other development environments in which similar needs arise to limit access to certain APIs, such as the examples described in the Background of the Invention.

There is therefore provided, in accordance with an embodiment of the present invention, a method for testing operation of a computer application, including:

providing an emulator to run on a development platform subject to limitations of multiple different target devices, the emulator including a set of emulator APIs corresponding to target Application Program Interfaces (APIs) available on the different target devices;

specifying a subset of the target APIs that are supported by one of the target devices;

blocking access by the emulator to the emulator APIs that correspond to one or more of the target APIs that are not in the specified subset; and running the application on the emulator subject to the blocked access.

Specifying the subset of the target APIs may include selecting one of the target devices to emulate, and the subset of the target APIs may include the target APIs that are supported by the selected one of the target devices. Alternatively, specifying the subset of the target APIs may include specifying the target APIs that are not supported by the one of the target devices.

In an embodiment, blocking access includes deleting, from the set of emulator APIs, emulator APIs that correspond to target APIs that are not in the specified subset of the target APIs.

Running the application subject to the blocked access may include generating an error indication when the emulator attempts to access one of the emulator APIs that corresponds to one of the target APIs that are not in the specified subset.

In an embodiment, the target devices include mobile devices, and the emulator includes a toolkit for developing applications for execution in a wireless environment. The target devices and the emulator may include respective virtual machines that support execution of programs written in an object-oriented, platform-independent programming language.

In an embodiment, blocking access to the emulator APIs includes deleting program components used by the emulator APIs to which access is blocked from a set of the program components available to the emulator.

Alternatively, blocking access to the emulator APIs includes deleting names of program components used by the emulator APIs to which access is blocked from a list of the program components available to the emulator. In an embodiment, the program components include classes of an object-oriented, platform-independent programming language. Deleting the names of program components may include extracting the names from at least one compressed file containing the names. In an embodiment, the compressed file is compressed in a platform-independent compression and file packaging format that supports bundling of executable files and other related application files.

There is also provided, in accordance with an embodiment of the present invention, a method for testing operation of a computer application, including:

providing an emulator including a set of emulator Application Program Interfaces (APIs);

specifying a subset of the set of APIs;

blocking access by the emulator to the APIs in the specified subset by deleting names of program components used by the emulator APIs to which access is blocked from a list of the program components available to the emulator; and running the application on the emulator subject to the blocked access.

There is further provided, in accordance with an embodiment of the present invention, a system for testing operation of a computer software application, the system including an emulation workstation, which is configured to operate as an emulator so as to run the application subject to limitations of multiple different target devices, the emulator having a set of emulator Application Program Interfaces (APIs) corresponding to target APIs available on the different target devices, such that when a subset of the target APIs that are supported by one of the target devices is specified, the emulator runs the application while blocking access to the emulator APIs that correspond to the target APIs that are not in the specified subset.

There is still further provided, in accordance with an embodiment of the present invention, a system for testing operation of a computer application, the system including a emulation workstation, which is configured to operate as an emulator, the emulator having a set of emulator Application Program Interfaces (APIs), such that when a subset of the emulator APIs is specified, the computer runs the application while blocking access to the emulator APIs that are in the specified subset by deleting names of program components used by the emulator APIs to which access is blocked from a list of the program components available to the emulator.

There is additionally provided, in accordance with an embodiment of the present invention, a computer software product for testing operation of a software application for a target device, the product including a computer-readable medium, in which program instructions are stored, which instructions, when read by a computer, cause the computer to operate as an emulator so as to run the application subject to limitations of multiple different target devices, the emulator having a set of emulator Application Program Interfaces (APIs) corresponding to target APIs available on the different target devices, such that when a subset of the target APIs that are supported by one of the target devices is specified, the computer runs the application while blocking access to the emulator APIs that correspond to the target APIs that are not in the specified subset.

There is yet additionally provided, in accordance with an embodiment of the present invention, a computer software product for testing operation of a computer application, the product including a computer-readable medium, in which program instructions are stored, which instructions, when read by a computer, cause the computer to operate as an emulator, the emulator having a set of Application Program Interfaces (APIs), such that when a subset of the set of APIs is specified, the computer runs the application while blocking access to the APIs that are in the specified subset.

BRIEF DESCRIPTION OF THE DRAWINGS

The present invention will be more fully understood from the following detailed description of the embodiments thereof, taken together with the drawings in which.

DETAILED DESCRIPTION OF EMBODIMENTS

Figure 1:
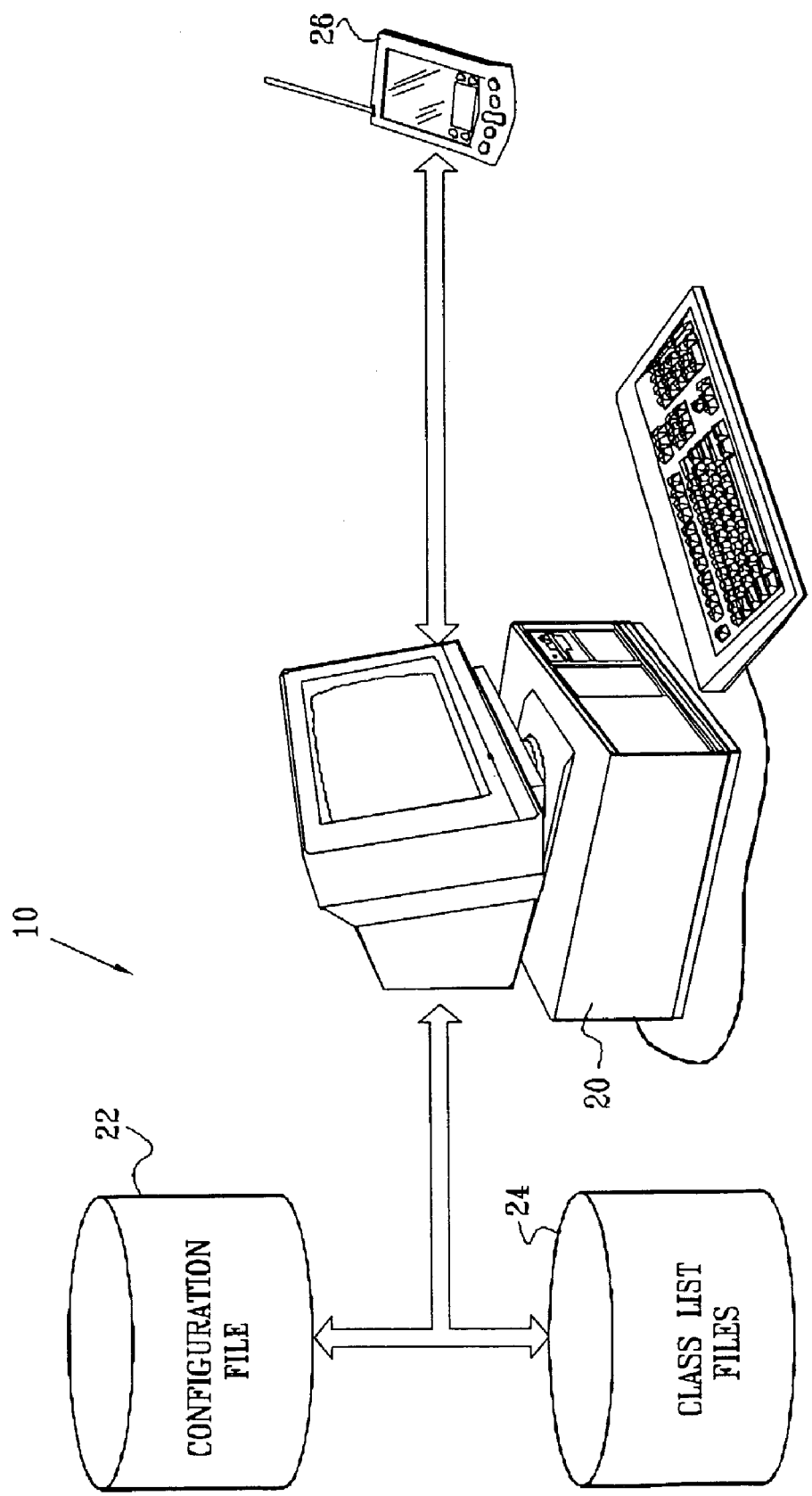
FIG. 1 is a schematic illustration of an emulator running on a development workstation, in accordance with an embodiment of the present invention.

FIG. 1 is a schematic illustration of a development system 10 running on an emulation workstation 20, in accordance with an embodiment of the present invention. The development system is used by an application developer to develop applications for at least one target device 26, such as an intelligent mobile device. Examples of intelligent mobile devices include personal digital assistants (PDAs) and programmable cellular telephones. For some applications, target device 26 supports an object-oriented, platform-independent programming environment, such as Java 2 Platform, Micro Edition (J2ME) and implements a virtual machine, such as a K Virtual Machine (KVM). Development system 10 uses a configuration file 22 and class list files 24, as described in greater detail herein below with reference to FIG. 2. Workstation 20 typically comprises a general purpose computer, which is programmed in software to carry out the functions described herein. This software may be downloaded to the workstation in electronic form, over a network, for example, or it may alternatively be provided on tangible media, such as magnetic or optical media or other non-volatile memory.

Figure 2:
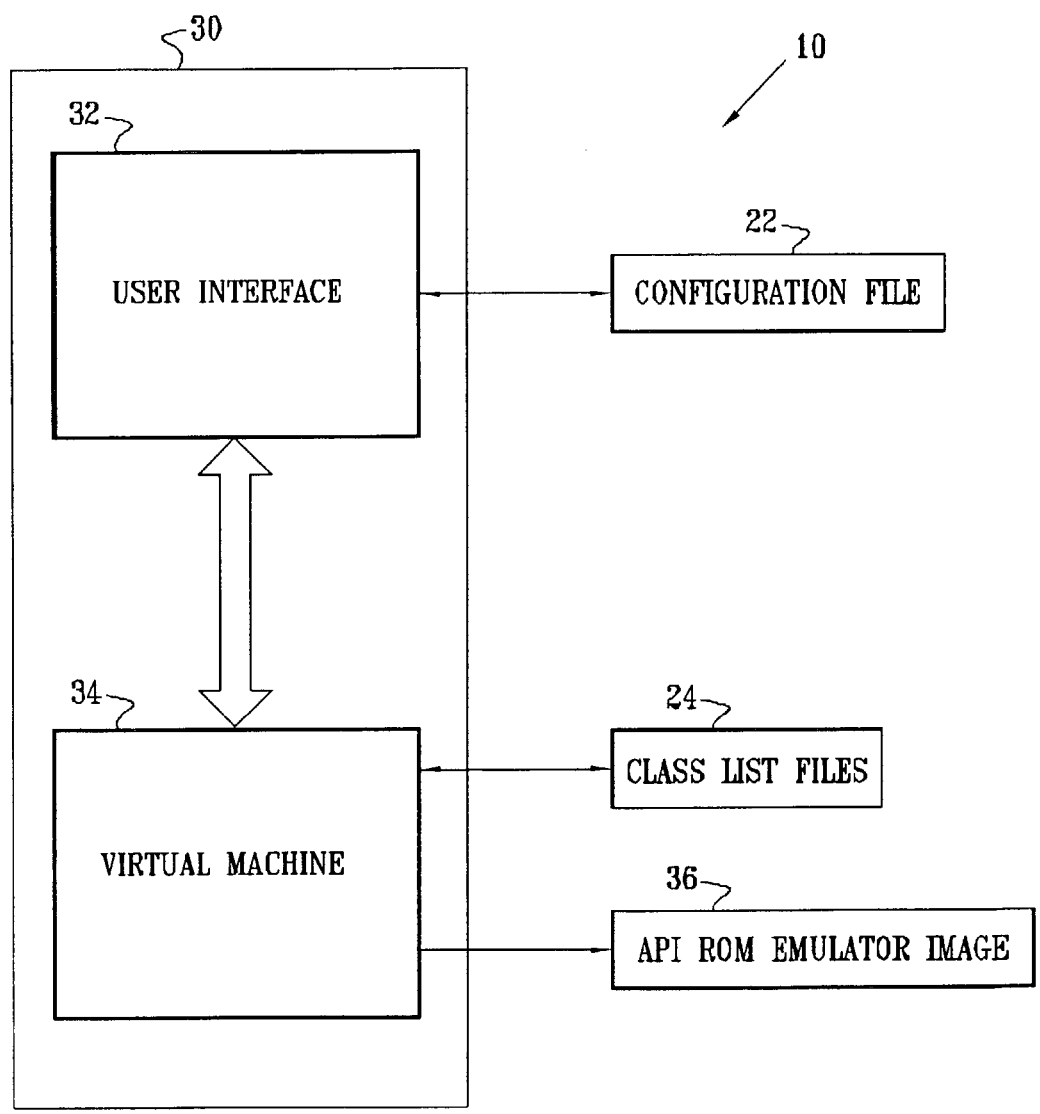
FIG. 2 is a block diagram that schematically illustrates components of the emulator of FIG. 1, in accordance with an embodiment of the present invention.

FIG. 2 is a block diagram that schematically illustrates components of development system 10 running on workstation 20, in accordance with an embodiment of the present invention. The development system comprises an emulator 30, which is suitable for developing applications for multiple different target devices 26 (FIG. 1), each of which has access to a limited set of target Application Programming Interfaces (APIs). For some applications, emulator 30 comprises a Wireless Toolkit (WTK) provided by Sun Microsystems for use ill developing J2ME applications. The emulator preferably comprises a user interface (UI) 32, which represents the whole of the application developer's working environment and not any specific user interface. Thus, the UI includes all software and graphics with which the developer interfaces directly. A virtual machine 34, preferably a KVM, runs on workstation 20, and is used by the developer to execute code developed for a target device. The UI and the KVM preferably interact as described hereinbelow with reference to FIG. 3.

As mentioned above, development system 10 further comprises at least one configuration file 22 and one or more class list files 24. Configuration file 22 comprises a list of APIs to which access is to be denied when developing for a particular target device. Alternatively, configuration file 22 comprises a list of APIs to which access is to be permitted during development. Preferably, emulator 30 provides support for a set of APIs that includes all APIs supported by all possible target devices 26. Thus, the list of APIs in configuration file 22 typically represents a subset of the set of APIs supported by the emulator. Preferably, the set of APIs supported by the emulator is provided in an API ROM emulator image 36, which is typically stored in RAM of the development system.

Preferably, one class list file 24 is provided for each API listed in configuration file 22. Class list files 24 are preferably compressed, most preferably in ZIP format or in a platform-independent compression and file packaging format that supports bundling of executable files and other related application files, such as the Java Archive (JAR) format. Preferably, each class list file comprises the names of the program components, such as classes, that are contained in the associated API. Alternatively, each class list file comprises the complete set of classes contained in the associated API, from which the names of the classes are extracted. The latter is typically the case when the class list files comprise JAR files containing Java libraries.

Figure 3:
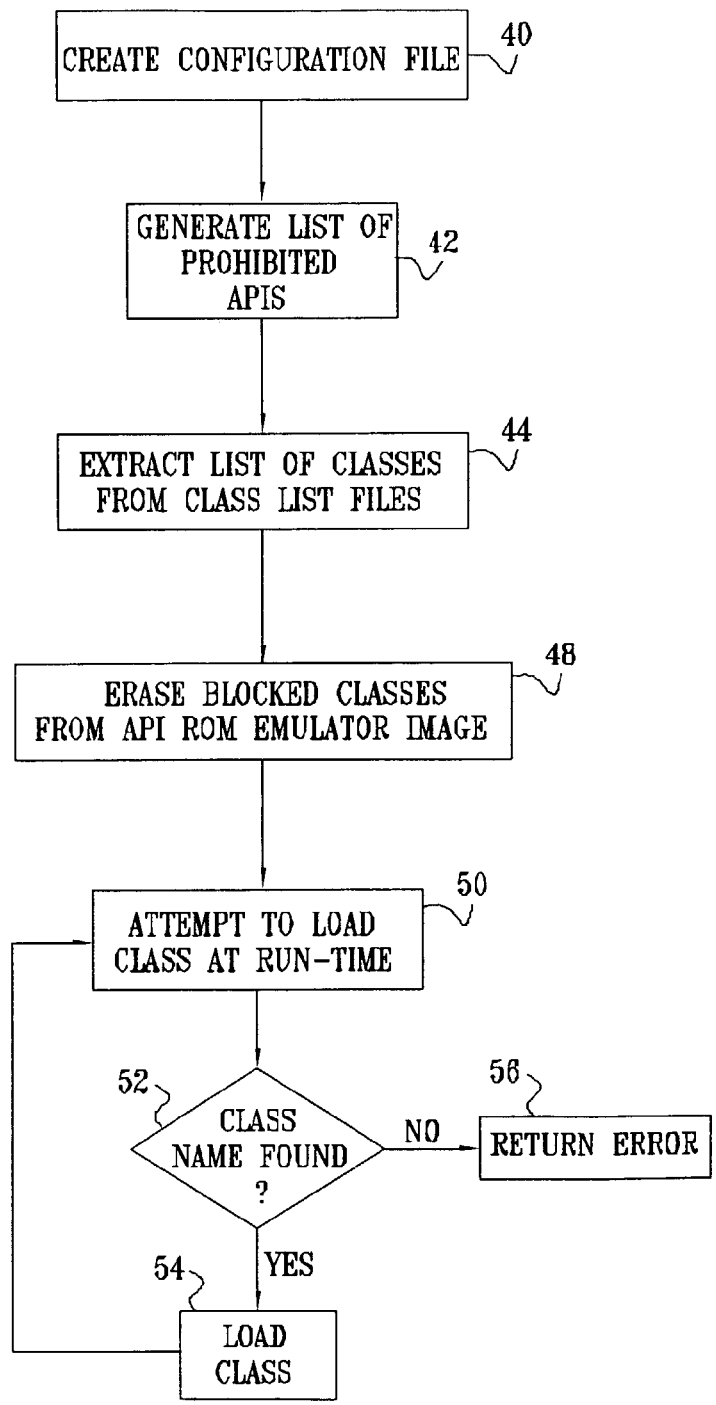
FIG. 3 is a flow chart that schematically illustrates a method for blocking access to selected APIs, in accordance with an embodiment of the present invention.

FIG. 3 is a flow chart that schematically illustrates a method for blocking access to specified APIs, in accordance with an embodiment of the present invention. When emulator 30 is started, a configuration file 22 is created, preferably by a developer using UI 32, at a create configuration file step 40. To create the configuration file, the developer either (a) specifies the APIs to which access is to be denied, or (b) specifies the APIs to which access is to be allowed. Alternatively, configuration files are pre-generated for specific target devices 26, so that the application developer need specify only the name of the target device, rather than selecting the APIs to be made available or blocked. The user interface examines the configuration file to determine a list of prohibited or allowable APIs, at a generate API list step 42, and passes the list to virtual machine 34. At an extraction step 44, code inserted into the emulator opens a respective class list file 24 corresponding to each prohibited API, and extracts from each opened class list file a list of classes to be blocked. Preferably, these lists are combined to generate a complete list of all classes to be blocked.

At a blocked classes erasure step 48, code inserted into virtual machine 34 scans API ROM emulator image 36 (which is now in RAM, since the emulator is running on a workstation, as described hereinabove), and looks for definitions of classes to which access is to be blocked. When such a class is found, its name is erased from API ROM emulator image 36. However, the definition of the class, i.e., its code, may be left intact. Alternatively, code inserted into emulator 30 performs step 48.

Virtual machine 34 of emulator 30 then executes code developed by the application developer. The virtual machine attempts to load classes at run-time, at a load class attempt step 50. Generally, the attempt to load the class occurs when creating the first instance of that class. The virtual machine checks whether the name of the desired class is found in API ROM emulator image 36, at a class name lookup step 52. If the class name is found, the virtual machine loads the class, at a load class step 54. The virtual machine continues execution of the code, returning to step 50 as necessary. On the other hand, if the class is not found, then an error message is returned to UI 32, at a return error step 56. The error message indicates to the developer that the API required for a particular function invoked by the application in development is not available on target device 26. It is noted that steps 50 through 54 are typically executed by the virtual machine using code included in standard versions of the virtual machine, without the need for any modifications to the core virtual machine functions.

Figure 4:
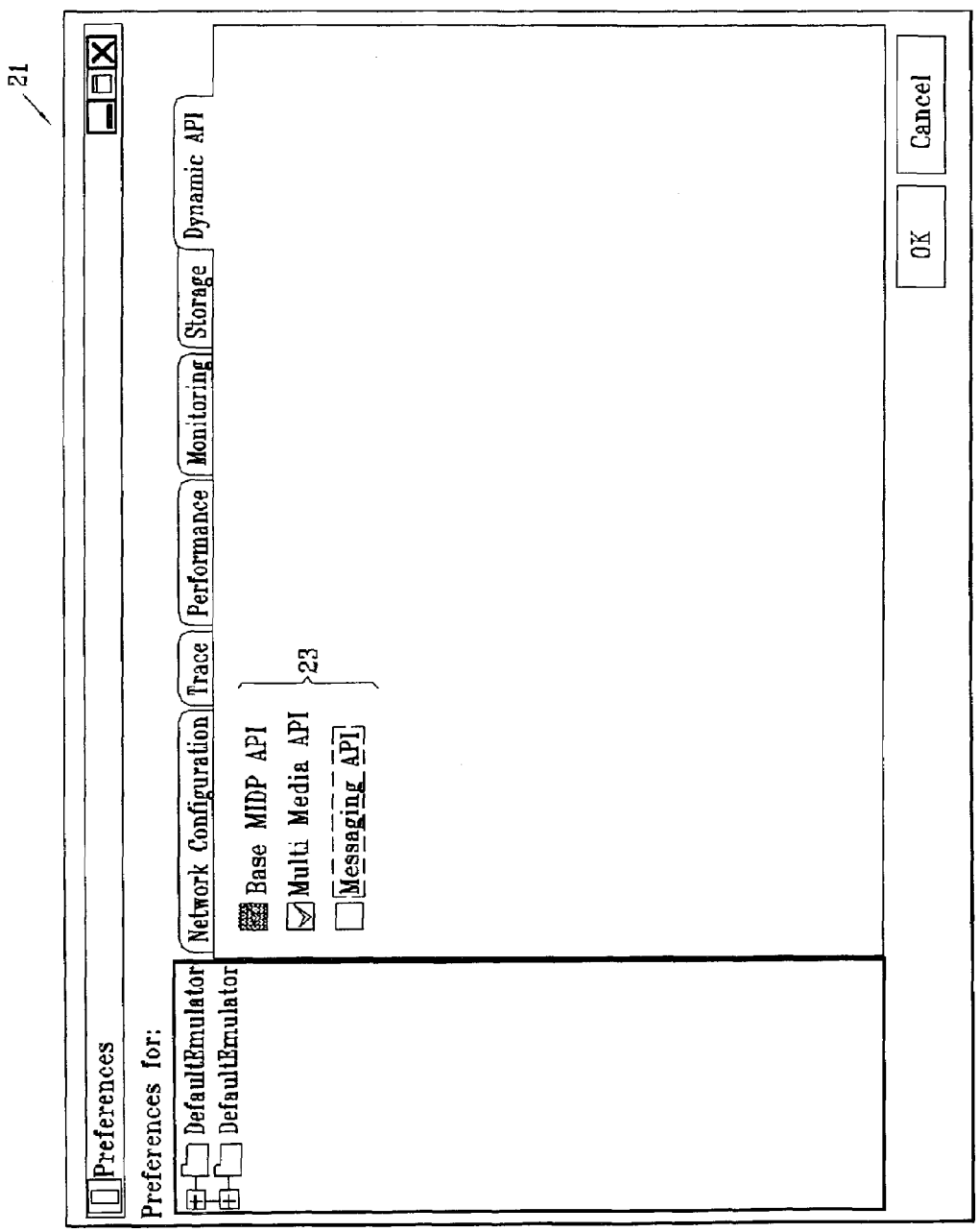
FIG. 4 is a schematic illustration of a screen image of a graphical user interface for selecting APIs, in accordance with an embodiment of the present invention.

FIG. 4 is a schematic illustration of a sample screen image 21 provided by UI 32 for use by a developer in selecting APIs to be blocked, in accordance with an embodiment of the present invention. Screen image 21 includes an API list 23, which the application developer uses to indicate which APIs are available/unavailable on the desired target device. Although only multimedia and messaging APIs are shown in API list 23, this limited selection is by way of example only; other groups of APIs may be displayed in the same manner.

In an embodiment of the present invention, emulator 30 comprises a Sun Microsystems WTK, preferably not earlier than version 1.0.4 (beta). In such a case, at least a portion of the techniques described herein are preferably implemented using the source code listed in Appendices A, B and C, which code is added to the WTK.

The code listed in Appendix A provides UI 32 for selecting APIs to be blocked or enabled, in accordance with an embodiment of the present invention. The code listed in Appendix B retrieves one of class list files 24, and returns an array of strings of fully-qualified class names to be blocked, in accordance with an embodiment of the present invention. The code listed in Appendix C erases the names of classes to be blocked from API ROM emulator image 36, in accordance with an embodiment of the present invention.

In addition, the following changes are preferably made in source files included in the standard distribution of the WTK:

In the KVM class.c file, in function InitializejavaSystemClasses( ), immediately after the function call to initialize the ROM image, InitializeROMImage( ), a call to the function removeAdditionalAPI( ), which is located in the file emuAPI.c, is inserted, as shown in Appendix C.

In the LIME include file limeKVM.h, a define statement is added: #define LIME_API_CLASS "APIManager", in order to register the lime server handler for managing the user's API selection.

After these changes are made, the WTK source files are compiled and linked together with the three additional source files shown in the Appendix.

Although the embodiments described in this patent application make use of particular features and vocabulary of the Java™ language and operating environments, and refer specifically to mobile device applications, the present invention is not limited to this context or to the particular implementation tools described here. Rather, the principles of the present invention may be applied using other programming languages, and may be used to solve problems of resource mismatches that may arise in development of applications for different sorts of target platforms. It will thus be appreciated that the disclosed embodiments are cited by way of example, and that the present invention is not limited to what is particularly shown and described herein. Rather, the scope of the present invention includes both combinations and sub-combinations of the various features described herein, as well as variations and modifications thereof which would occur to persons skilled in the art upon reading the description and which are not disclosed in the prior art.

The invention claimed is:

1. A method for testing operation of a computer application, comprising:

providing an emulator to run on a development platform subject to limitations of multiple different target devices, the emulator including a set of emulator APIs corresponding to target Application Program Interfaces (APIs) available on the different target devices;

specifying a subset of the target APIs that are supported by one of the target devices;

selectively blocking access by the emulator to the emulator APIs that correspond to one or more of the target APIs that are not in the specified subset without blocking the emulator APIs that correspond to the target APIs in the specified subset;

running the application on the emulator subject to the blocked access so as to provide an assessment of how the application will run on the one of the target devices; and displaying an error indication when the emulator attempts to access one of the emulator APIs that corresponds to one of the target APIs that are not in the specified subset, so as to indicate to a developer that an API required for a particular function is not available on the one of the target devices.

2. A method according to claim 1, wherein specifying the subset of the target APIs comprises selecting one of the target devices to emulate, and wherein the subset of the target APIs comprises the target APIs that are supported by the selected one of the target devices.

3. A method according to claim 1, wherein specifying the subset of the target APIs comprises specifying the target APIs that are not supported by the one of the target devices.

4. A method according to claim 1, wherein blocking access comprises deleting, from the set of emulator APIs, emulator APIs that correspond to target APIs that are not in the specified subset of the target APIs.

5. A method according to claim 1, wherein the target devices comprise mobile devices, and wherein the emulator comprises a toolkit for developing applications for execution in a wireless environment.

6. A method according to claim 1, wherein the target devices and the emulator comprise respective virtual machines that support execution of programs written in an object-oriented, platform-independent programming language.

7. A method according to claim 1, wherein blocking access to the emulator APIs comprises deleting program components used by the emulator APIs to which access is blocked from a set of the program components available to the emulator.

8. A method according to claim 1, wherein blocking access to the emulator APIs comprises deleting names of program components used by the emulator APIs to which access is blocked from a list of the program components available to the emulator.

9. A method according to claim 8, wherein the program components comprise classes of an object-oriented, platform-independent programming language.

10. A method according to claim 8, wherein deleting the names of program components comprises extracting the names from at least one compressed file containing the names.

11. A method according to claim 10, wherein the compressed file is compressed in a platform-independent compression and file packaging format that supports bundling of executable files and other related application files.

12. A method for testing operation of a computer application, comprising:
    providing an emulator including a set of emulator Application Program Interfaces (APIs);
    specifying a subset of the set of APIs;
    blocking access by the emulator to the APIs in the specified subset by deleting names of program components used by the emulator APIs to which access is blocked from a list of the program components available to the emulator;
    running the application on the emulator subject to the blocked access so as to provide an assessment of how the application will run on a target device; and
    displaying an error indication when the emulator attempts to access one of the emulator APIs that are in the specified subset, so as to indicate to a developer that an API required for a particular function is not available on the target device.

13. A system for testing operation of a computer software application, the system comprising an emulation workstation, which is configured to operate as an emulator so as to run the application subject to limitations of multiple different target devices, the emulator having a set of emulator Application Program Interfaces (APIs) corresponding to target APIs available on the different target devices, such that when a subset of the target APIs that are supported by one of the target devices is specified, the emulator runs the application while selectively blocking access to the emulator APIs that correspond to the target APIs that are not in the specified subset without blocking the emulator APIs that correspond to the target APIs in the specified subset, wherein the emulation workstation displays an error indication when the emulator attempts to access one of the emulator APIs that corresponds to one of the target APIs that are not in the specified subset, so as to indicate to a developer that an API required for a particular function is not available on the one of the target devices.

14. A system according to claim 13, wherein the subset of the target APIs is specified by selecting one of the target devices to emulate, and wherein the subset of the target APIs comprises the target APIs that are supported by the selected one of the target devices.

15. A system according to claim 13, wherein the subset of the target APIs is specified by specifying the target APIs that are not supported by the one of the target devices.

16. A system according to claim 13, wherein the emulator is adapted to block access to the emulator APIs that correspond to the target APIs that are not in the specified subset by deleting, from the set of emulator APIs, the emulator APIs that correspond to the target APIs that are not in the specified subset of the target APIs.

17. A system according to claim 13, wherein the target devices comprise mobile devices, and wherein the emulator comprises a toolkit for developing applications for execution in a wireless environment.

18. A system according to claim 13, wherein the target devices and the emulator comprise respective virtual machines that support execution of programs written in an object-oriented, platform-independent programming language.

19. A system according to claim 13, wherein the emulator is adapted to block access to the emulator APIs that correspond to the target APIs that are not in the specified subset by deleting program components used by the emulator APIs to which access is blocked from a set of the program components available to the emulator.

20. A system according to claim 13, wherein the emulator is adapted to block access to the emulator APIs that correspond to the target APIs that are not in the specified subset by deleting names of program components used by the emulator APIs to which access is blocked from a list of the program components available to the emulator.

21. A system according to claim 20, wherein the program components comprise classes of an object-oriented, platform-independent programming language.

22. A system according to claim 20, wherein the emulator is adapted to extract the names of the program components to which access is blocked from at least one compressed file containing the names.

23. A system according to claim 22, wherein the compressed file is compressed in a platform-independent compression and file packaging format that supports bundling of executable files and other related application files.

24. A system for testing operation of a computer application on a computer, the system comprising an emulation workstation, which is configured to operate as an emulator, the emulator having a set of emulator Application Program Interfaces (APIs), such that when a subset of the emulator APIs is specified, the computer runs the application while blocking access to the emulator APIs that are in the specified subset by deleting names of program components used by the emulator APIs to which access is blocked from a list of the program components available to the emulator, wherein the emulation workstation displays an error indication when the emulator attempts to access one of the emulator APIs that are in the specified subset, so as to indicate to a developer that an API required for a particular function is not available.

25. A computer software product for testing operation of a software application for a target device, the product comprising a computerreadable medium, in which program instructions are stored, which instructions, when read by a computer, cause the computer to operate as an emulator so as to run the application subject to limitations of multiple different target devices, the emulator having a set of emulator Application Program Interfaces (APIs) corresponding to target APIs available on the different target devices, such that when a subset of the target APIs that are supported by one of the target devices is specified, the computer runs the application while selectively blocking access to the emulator APIs that correspond to the target APIs that are not in the specified subset without blocking the emulator APIs that correspond to the target APIs in the specified subset, wherein the instructions cause the computer to display an error indication when the emulator attempts to access one of the emulator APIs that corresponds to one of the target APIs that are not in the specified subset, so as to indicate to a developer that an API required for a particular function is not available on the one of the target devices.

26. A product according to claim 25, wherein the subset of the target APIs is specified by selecting one of the target devices to emulate, and wherein the subset of the target APIs comprises the target APIs that are supported by the selected one of the target devices.

27. A product according to claim 25, wherein the subset of the target APIs is specified by specifying the target APIs that are not supported by the one of the target devices.

28. A product according to claim 25, wherein the instructions cause the computer to block access to the emulator APIs that correspond to the target APIs that are not in the specified subset by deleting, from the set of emulator APIs, emulator APIs that correspond to target APIs that are not in the specified subset of the target APIs.

29. A product according to claim 25, wherein the target devices comprise mobile devices, and wherein the program instructions are a component of a toolkit for developing applications for execution in a wireless environment.

30. A product according to claim 25, wherein the target devices comprise a first virtual machine, and wherein the program instructions cause a second virtual machine to run on the computer, the first and second virtual machines providing substantially identical support for execution of programs written in an object-oriented, platform-independent programming language.

31. A product according to claim 25, wherein the instructions cause the computer to block access to the emulator APIs that correspond to the target APIs that are not in the specified subset by deleting program components used by the emulator APIs to which access is blocked from a set of the program components available to the emulator.

32. A product according to claim 25, wherein the instructions cause the computer to block access to the emulator APIs that correspond to the target APIs that are not in the specified subset by deleting names of program components used by the emulator APIs to which access is blocked from a list of the program components available to the emulator.

33. A product according to claim 32, wherein the program components comprise classes of an object-oriented, platform-independent programming language.

34. A product according to claim 32, wherein the instructions cause the computer to extract the names of the program components to which access is blocked from at least one compressed file containing the names.

35. A product according to claim 34, wherein the compressed file is compressed in a platform-independent compression and file packaging format that supports bundling of executable files and other related application files.

36. A computer software product for testing operation of a computer application, the product comprising a computer-readable medium, in which program instructions are stored, which instructions, when read by a computer, cause the computer to operate as an emulator, the emulator having a set of Application Program Interfaces (APIs), such that when a subset of the set of APIs is specified, the computer runs the application while blocking access to the APIs that are in the specified subset by deleting names of program components used by the emulator APIs to which access is blocked from a list of the program components available to the emulator, wherein the instructions cause the computer to display an error indication when the emulator attempts to access one of the emulator APIs that are in the specified subset, so as to indicate to a developer that an API required for a particular function is not available.

* * * * *